(12) United States Patent  
Oishi

(10) Patent No.: US 6,471,529 B2
(45) Date of Patent: Oct. 29, 2002

(54) ROTARY CONNECTOR

(75) Inventor: Hiroshi Oishi, Ota-ku (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 09/833,810

(22) Filed: Apr. 13, 2001

(65) Prior Publication Data

US 2001/0036760 A1 Nov. 1, 2001

(30) Foreign Application Priority Data

Apr. 14, 2000 (JP) .................................... 2000-114280

(51) Int. Cl.[7] .............................................. H01R 35/04
(52) U.S. Cl. ..................................................... 439/164
(58) Field of Search ........................ 439/164, 15, 491, 439/488

(56) References Cited

U.S. PATENT DOCUMENTS

| | | | | |
|---|---|---|---|---|
| 5,669,777 A | * | 9/1997 | Matsumoto et al. | 439/164 |
| 5,766,019 A | * | 6/1998 | Matsumoto et al. | 439/164 |
| 5,785,541 A | * | 7/1998 | Best et al. | 439/164 |
| 5,882,216 A | * | 3/1999 | Matsumoto et al. | 439/164 |
| 5,944,544 A | * | 8/1999 | Kuroda et al. | 439/164 |
| 6,053,742 A | * | 4/2000 | Matsumoto et al. | 439/164 |

FOREIGN PATENT DOCUMENTS

| | | |
|---|---|---|
| JP | 64-2653 | 1/1989 |
| JP | 2-71050 | 5/1990 |
| JP | UM 2523310 | 10/1996 |

* cited by examiner

Primary Examiner—Gary F. Paumen
(74) Attorney, Agent, or Firm—Rader, Fishman, & Grauer PLLC; Ronald P. Kananen, Esq.

(57) ABSTRACT

A rotary connector includes a stator housing 3a installed at a chassis side of a vehicle; a case 4 arranged at the stator housings 3a; a rotor 5 rotatably mounted at the stator housing 3a and connected to a steering wheel; a floating member 6 rotatably engaged with an, outer circumferential part of the rotor 5 and rotatably arranged above bottom surface 3k of the stator housing 3a; and a wound flat cable 7 of which one end is fixed to the rotor 5, the other end of which is fixed to the case 4 and intermediate part of which is passed through reversing segments 6b, 6c formed in the floating member 6 and reversed.

21 Claims, 10 Drawing Sheets

ROTARY CONNECTOR

FIELD OF THE INVENTION

The present invention relates to a rotary connector for electrically connecting between a chassis of vehicle and a steering wheel. More particularly, the present invention relates to a rotary connector provided with a flat cable having a reversing segment.

BACKGROUND OF THE INVENTION

A rotary connector such as that disclosed in the gazette of Japanese Utility Model Registration No. 2523310 is constructed such that a case member is constituted by an inner case, an outer case and a guide ring. A flat cable is stored in the case member in such a way that a reversing segment is formed at the midway part in its winding direction and then the cable is used for attaining an electrical connection between the chassis and the steering wheel.

This rotary connector is the type in which an inner surface at the flange of the inner case is formed with an annular notch to which the ring main body of the guide ring is fitted and the guide ring main body is rotatably fitted to the annular notch. Then, the ring main body is rotated while its inner circumferential surface and outer circumferential surface are restricted by the inner circumferential surface and the outer circumferential surface of the annular notch.

In addition, a type of rotary connector that is provided with a display segment that indicates the rotating position of the rotor housing has been disclosed in the gazette of Japanese Utility Model Laid-Open No. Hei 271050. This rotary connector is constructed such that a storing case for storing the cable member is constituted by a fixing case fixed to a steering column and having an inner gear, and a rotor member rotated together with the steering wheel so as to attain an electrical connection between the chassis side and the steering wheel through the cable member.

The fixing case, a ring-like gear member and a cover member constitute the storing case. The fixing case is provided with either a second index or a third index at its upper surface and the like. The ring-like gear member is engaged with the inner gear of the fixing case and has a display window or the second index for displaying a rotating state of the rotor member. Above the ring-like gear member is provided a cover member supporting the ring-like gear member and having the sight window where the second and third indexes appear. Then, it is acknowledged whether or not the rotor is placed at the neutral position through the second index or the third index appeared at the sight window.

In addition, another type of rotary connector is disclosed in the gazette of Japanese Utility Model Laid-Open No. Sho 64-2653, and is operated such that the neutral position of the rotor member is held by a temporary fixing member comprised of a film-like tape before the connector is assembled to the chassis. Triangle marks for use in aligning the neutral position are adhered to the rotor and the fixing member in the temporary fixing member and it is fixed such that either the rotor member or the flat cable may not be rotated. In addition, to the upper surface of the rotor member in the rotary connector is adhered a caution note called as a caution label of one sheet of seal form for the installation.

However, the prior art rotary connector disclosed in the gazette of Japanese Utility Model Registration No. 2523310 described above has some problems that its sliding resistance is high, and a sliding sound is generated due to the fact that the area of the cylindrical surface contact segment of the guide ring that contacts the cylindrical surface of either the inner case or the outer case is relatively wide.

Since the rotary connector disclosed in the aforesaid gazette of Japanese Utility Model Laid-Open No. Hei 2-71050 is provided with a gear mechanism, the number of component parts or the number of assembling steps is increased, its cost is increased and at the same time the entire rotary connector is increased in its size.

In addition, the aforesaid rotary connector disclosed in the gazette of Japanese Utility Model Laid-Open No. Sho 642653 is constructed such that the temporary fixing member is merely adhered to the neutral position of the rotor, wherein it has a problem that as the rotor is already rotated, it can not be judged how many times the rotor is rotated from the neutral position to the right or left side.

The present invention has been invented in order to overcome the aforesaid problems and it has the following objects. Consequently, a first object of the present invention is to provide a rotary connector in which a sliding sound in the rotary connector is eliminated. A second object of the present invention is to provide a rotary connector in which its neutral position is displayed by a simple structure. A third object of the present invention is to provide a rotary connector capable of applying display of its neutral position and the caution label.

SUMMARY OF THE INVENTION

The present invention has been invented in order to solve the aforesaid prior art problems. It is an object of the invention to provide a rotary housing including stator housings installed at a chassis side of a vehicle; a case arranged at the stator housings; a rotor rotatably mounted at the stator housings and connected to a steering wheel; a floating member rotatably engaged with an outer circumferential part of the rotor and rotatably arranged above bottom surfaces of the stator housings; and a wound flat cable of which one and is fixed to the rotor, the other end of which is fixed to the case and intermediate part of which is passed through reversing parts formed in the floating member and reversed.

The floating member can have a plurality of protruded engaging pieces formed inwardly at an upper end of an inner wall surface, and the engaging pieces rotatably engaged with the rotor.

The rotor can be formed at an upper side outer circumferential end with a first step to which an inner edge of a hole formed in the case is fitted and the lower part of the first step is formed with a second step to which the engaging piece of the floating member is rotatably engaged.

The rotor can have an axial insertion segment passing through a steering shaft formed at the axial center side, a cord insertion segment having a harness passing along the axial center side line formed at the inner wall of the axial insertion segment, and at its lower surface a terminal installing part for installing a movable side terminal fixed to one end of the flat cable. The movable side terminal is then connected to one end of the harness having a connector. The harness has the other end passed through the cord insertion segment and has a wire arranged at an upper surface of the rotor, and a lateral lid is installed the axial center side of said cord insertion segment.

The floating member may have a smooth sheet for reducing sliding resistance, or emboss at the inner wall surface where said rotor is inserted.

The case can include a side plate having a claw to which an engaging hole of an engaging piece formed at the stator housing is engaged. An upper plate is arranged above the floating member so as to cover the floating member.

The stator housing may be integrally formed with a base of a combination switch.

In such a case, the base may be made such that the upper surface of the base may also act as the bottom surface of the stator housing of the rotary connector, and an engaging piece having an engaging hole to which a claw of a side plate of the case is engaged is integrally formed around the bottom surface of the base.

Further, in such a case the base may be made such that an enclosure to which the lower end of the case is fitted is integrally formed around the bottom surface.

Further, such a case may be made such that terminal installing segments installing fixed side terminals having one end of the flat cables fixed thereto are formed at a circumferential part of the case. The fixed side terminals are made such that the terminals are insert molded, lower locations are fitted to insertion holes punched at the stator housing, and the terminals are arranged in the connector formed at the base.

The rotor may be formed with terminal installing segments installing movable side terminals having one end of the flats cables fixed thereto. The movable side terminals are made such that the terminal is insert molded and the terminal is arranged in the connector segment formed in the rotor.

In this case, the rotor forms each of terminal installing segments installing each of movable side terminals having one end of a plurality of flat cables fixed thereto. The movable side terminals are made such that each of the flat cables is guided out into a winding space arranged between the rotor and the floating member at an outer circumferential segment of the rotor through equal space. The floating member is provided with reversing segments only by the number of flat cables and at the same time the reversing segments are equally spaced apart.

The rotor forms cancel pins can be abutted against a cancel cam of a turn signal switch so as to cause an operating lever to be automatically moved.

The stator housing can be integrally formed with a protruded ear having a through-pass hole where a screw is inserted and passes at its circumferential segment. The base of the combination switch is formed with a threaded hole having the screw threadably engaged with it, and the stator housing is threadably stopped.

The stator housing can be integrally formed with an engaging piece engaged with an engaging segment formed at the base of the combination switch and is fixed to the base with the engaging piece.

The case and the rotor can be set such that the case and the rotor are temporarily set with a caution label separator when the rotor is placed at a neutral position. The caution label separator has a first caution label adhered to the upper plate of the case and a second caution label adhered to the upper surface of the rotor.

In this case, the first and second caution labels have descriptions about the fixing of the rotary connector. The caution label separator is a transparent member or an opaque member adhered to the surfaces of the first and second caution labels, and the separator is peeled off when the rotary connector is assembled to a chassis to cause the rotor to be rotatable.

The floating member and rotor can have a first mark and a second mark oppositely faced to each other when the rotary connector is placed at a neutral position. The case is formed by a non-transparent member and a first mark of the floating member that is arranged below the case forms a display window visually acknowledged.

This type of case has the display window formed with a through-pass hole. the display window forms a protrusion and a supporting segment at an edge of the through-pass hole and at the same time the transparent member is held by the protrusion and the supporting segment.

Further, this type of case can adhere to the first caution label at the surface of the upper plate. The first caution label has the display hole formed in compliance with the display window, and the display hole is arranged in compliance with the circumference of the transparent member.

The floating member and rotor can have the first mark and the second mark oppositely faced to each other when the rotary connector is in a neural position. The case is comprised of a transparent member where the first mark of the floating member is arranged below the case can be visually acknowledged.

Figure 1:
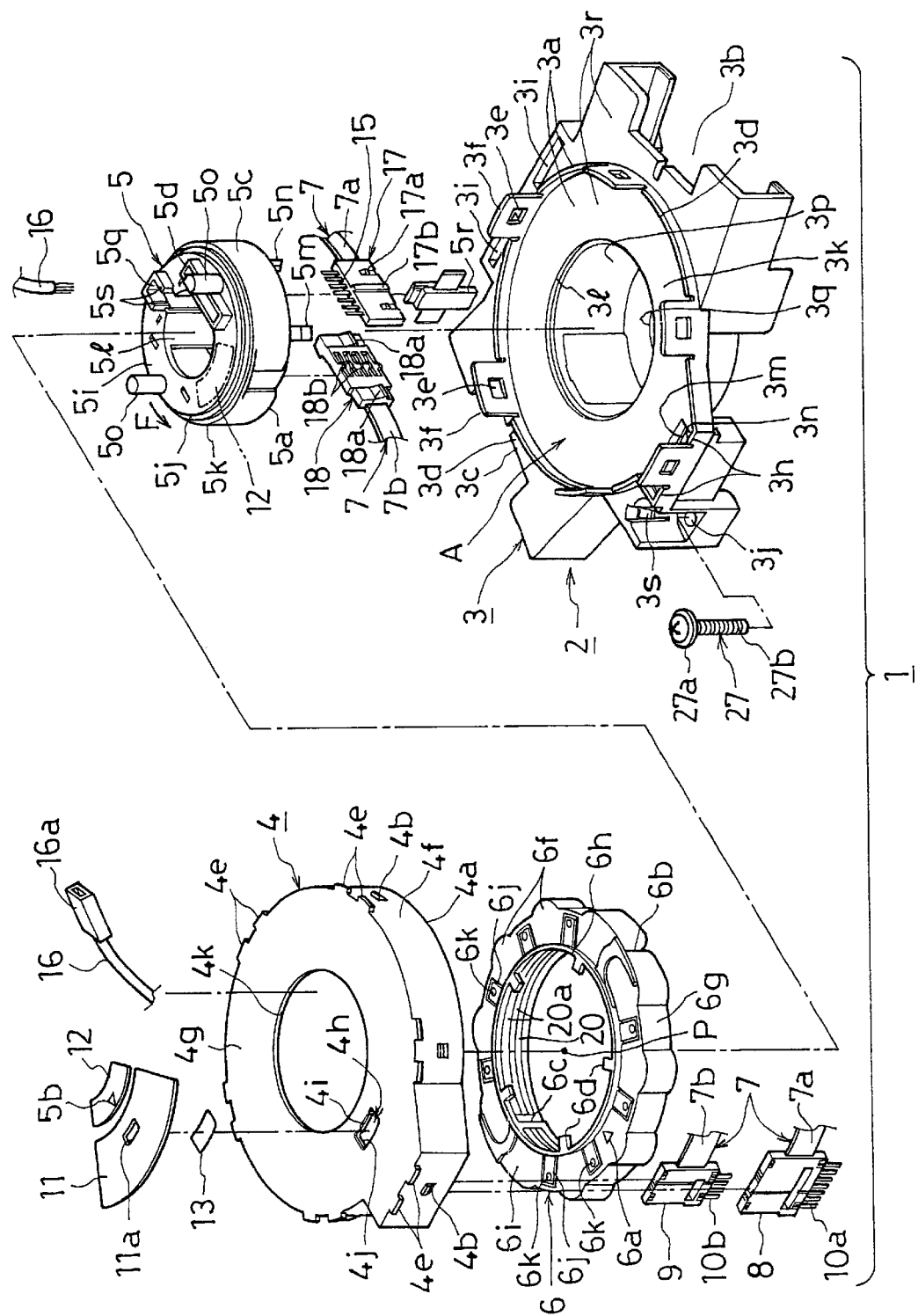
FIG. 1 is an exploded perspective view showing a first preferred embodiment of the present invention.

DETAILED DESCRIPTION OF THE INVENTION (First Preferred Embodiment)

Referring to FIGS. 1 to 8, a first preferred embodiment of the present invention will be described in detail. Reference numeral 1 denotes a rotary connector for electrically connecting between the steering wheel (not shown) of a vehicle and the chassis.

Figure 4:
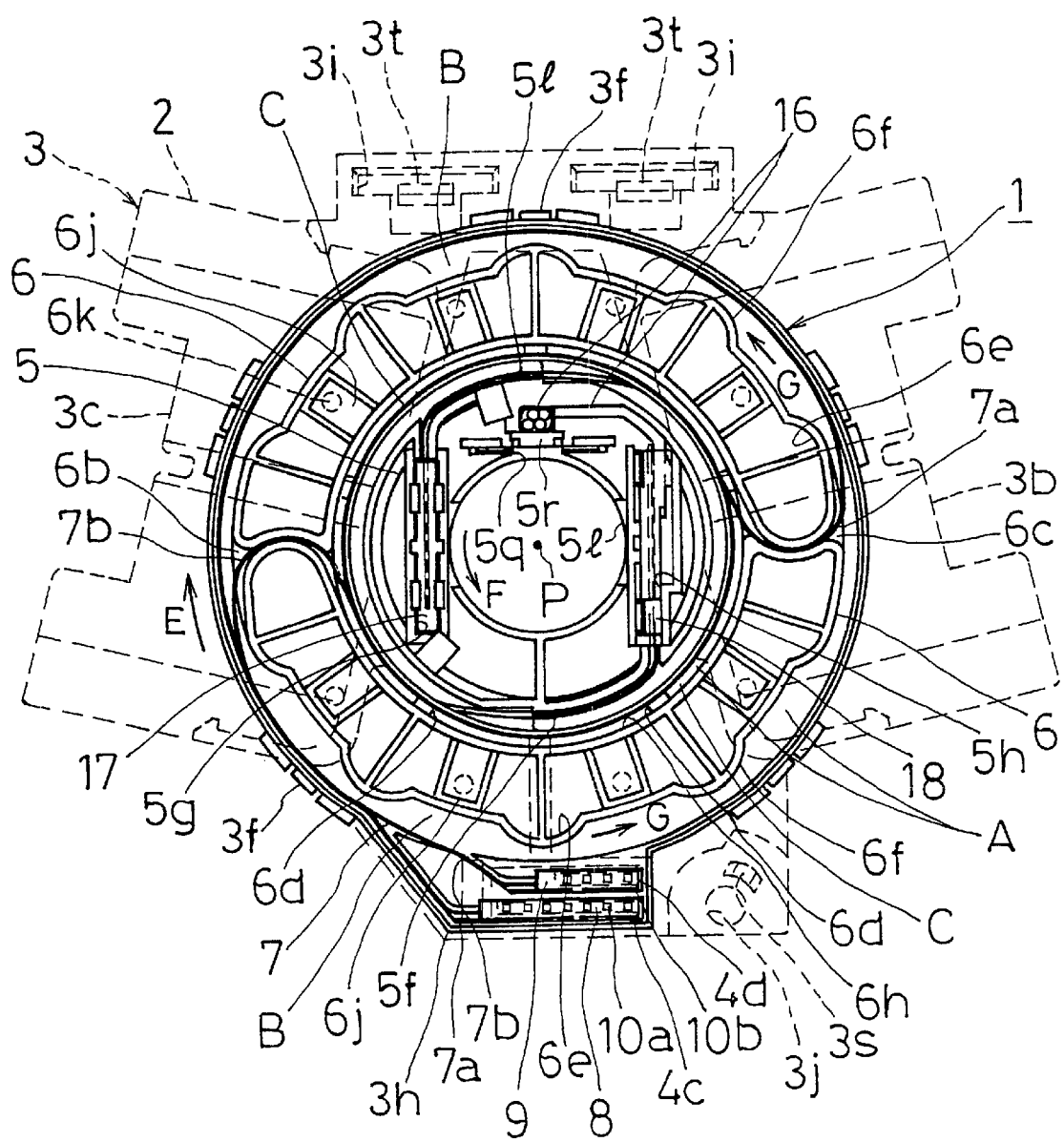
FIG. 4 is a sectional view taken along line X—X in an arrow direction of FIG. 3.

The rotary connector 1 is, as shown in FIG. 4, comprised of a stator housing 3a integrally formed with the base 3 of the combination switch 2 fixed to a steering column (not shown); the case 4 engaged with the stator housing 3a; the rotor 5 engaged with the lower surface of the steering wheel and rotatable; the floating member 6 rotatably arranged in a storing space A between the rotor 5 and the stator housing 3a; and a flat cable 7 wound in a winding space B between the floating member 6 and the rotor 5, and in a winding space C between the floating member 6 and the stator housing 4.

The combination switch 2 has notches 3b, 3c at the right and left sides of the base 3, and the stator housing 3a is integrally formed with the upper surface. In the case of a right side steering-wheel type automobile, switch bodies (not shown) such as a turn signal switch, a front lighting switch, a main dimmer switch and a passing switch or the like are installed in the notch 3b of the base 3. A switch body (not shown) such as a wiper washer switch or the like is installed in the notch 3c.

The base 3 has notches 3b, 3c having symmetrical shape to each other, it can be adapted for a left side steeringwheel type automobile by a method wherein the body of the wiper washer switch or the like is mounted at the right side notch 3b and the body of the turn signal switch or the like is mounted in the left side notch 3c.

Figure 2:
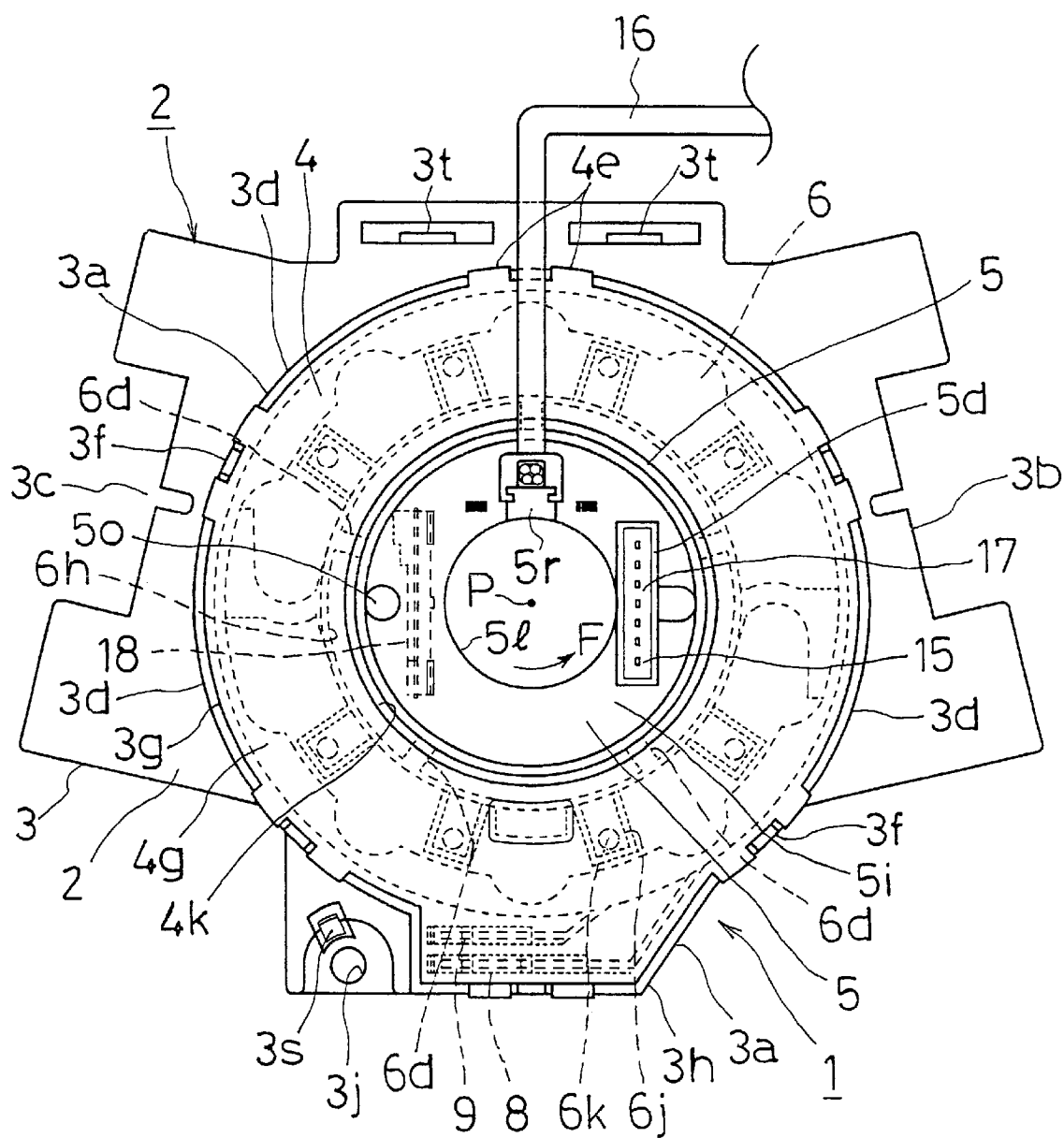
FIG. 2 is a top plan view for showing a rotary connector in a first preferred embodiment of the present invention where the case is removed from the base.
Figure 6:
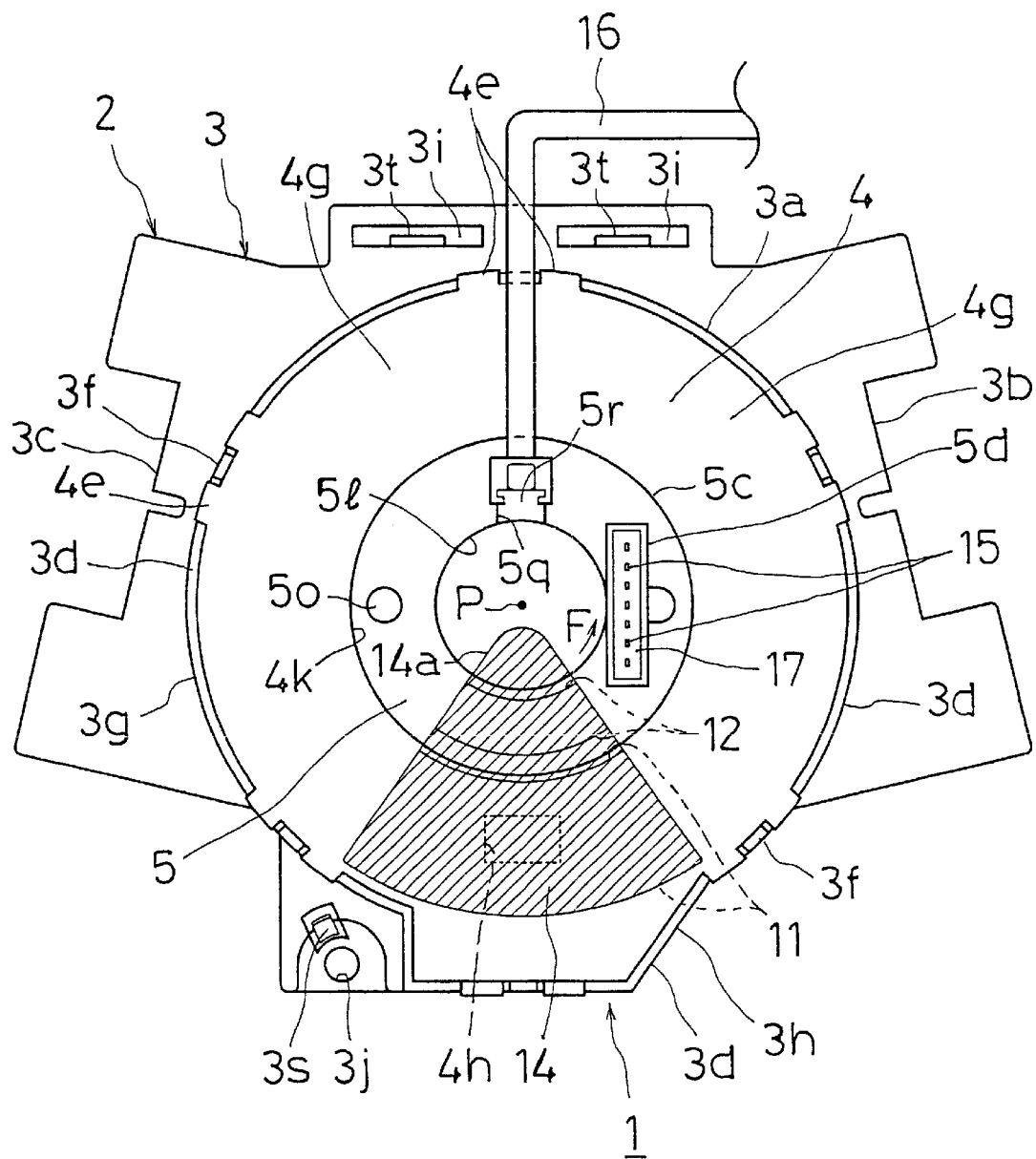
FIG. 6 is a top plan view for showing a first preferred embodiment of the present invention where the caution label separator is adhered to the rotary connector.

As shown in FIGS. 2, 4 and 6, the base 3 is a resin member made such that the engaging segment 3l having a claw 3t at its inner wall is installed at the engaging piece of a bracket (not shown) of a steering column (not shown) or a hole formed at the engaging piece, the screw 27 indicated in FIG. 1 is inserted and passed through the through-pass hole 3j and threadably fitted to the bracket and fixed to the steering column. As shown in FIG. 1, the screw 27 is made such that a flat washer-type flange 27a is integrally molded and the threaded segment 27b is inserted into the through-pass hole 3j, thereby the flange 27a is engaged with the dropping preventive piece 3s and further it is mounted under a state in which the threaded segment 27b is always inserted into the through-pass hole 3j.

The stator housing 3a constituting the bottom plate segment of the fixing case of the rotary connector 1 is integrally formed with resin on the upper surface of the base 3. The stator housing 3a is comprised of a bottom surface 3k constituting the bottom surface of the box at the upper surface of the base 3, and the enclosure 3d constituting a part of the side surface of the box. The stator housing 3a is integrally made such that the enclosure 3d to which the lower end 4a of the substantial ring-like case 4 is fitted is being protruded upwardly.

Figure 5:
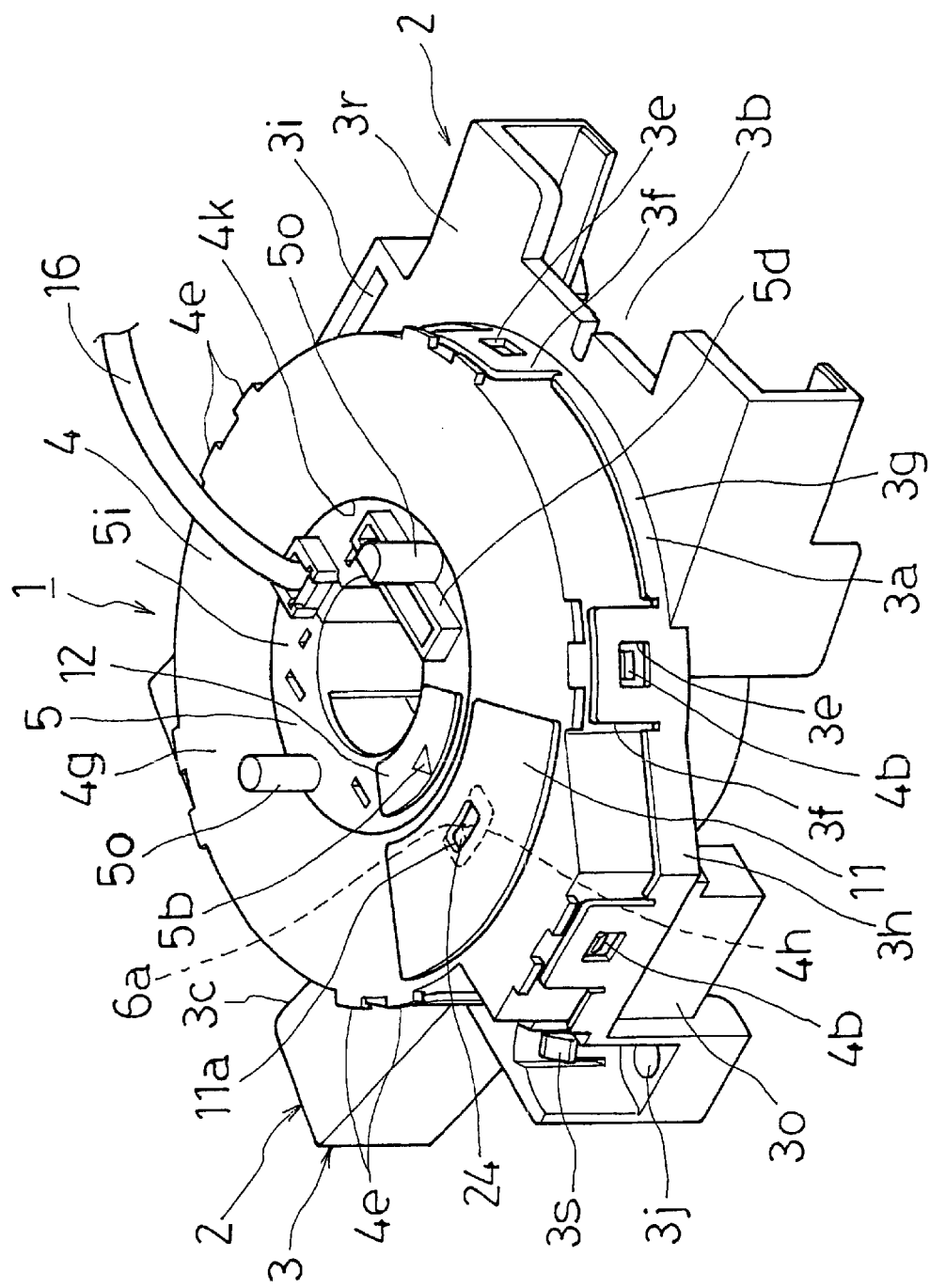
FIG. 5 is a perspective view for showing a first preferred embodiment of the present invention.

As shown in FIGS. 1 and 5, the enclosure 3d is comprised of a circular wall 3g having the flat cable 7 installed therein, and a terminal wall 3h into which the fixed side terminals 8, 9 are installed. The enclosure 3d is formed with a plurality of engaging pieces 3f having engaging holes 3e to which the claws 4b formed at the outer wall of the case 4 are engaged.

The inner end segment of the bottom surface 3k is formed with a step 3l to which the lower circumferential edge 5a of the rotor 5 is slidably fitted. The bottom surface 3k In the terminal wall 3h is formed with insertion holes 3m, 3n into which the fixed side terminals 8, 9 installed at the terminal installing segments 4c, 4d of the case 4 are inserted. Below the insertion holes 3m, 3n is formed a connector 3c communicated with the flat cables 7a, 7b and having insert molded at 10a, 10b to the fixed side terminals 8, 9.

Figure 3:
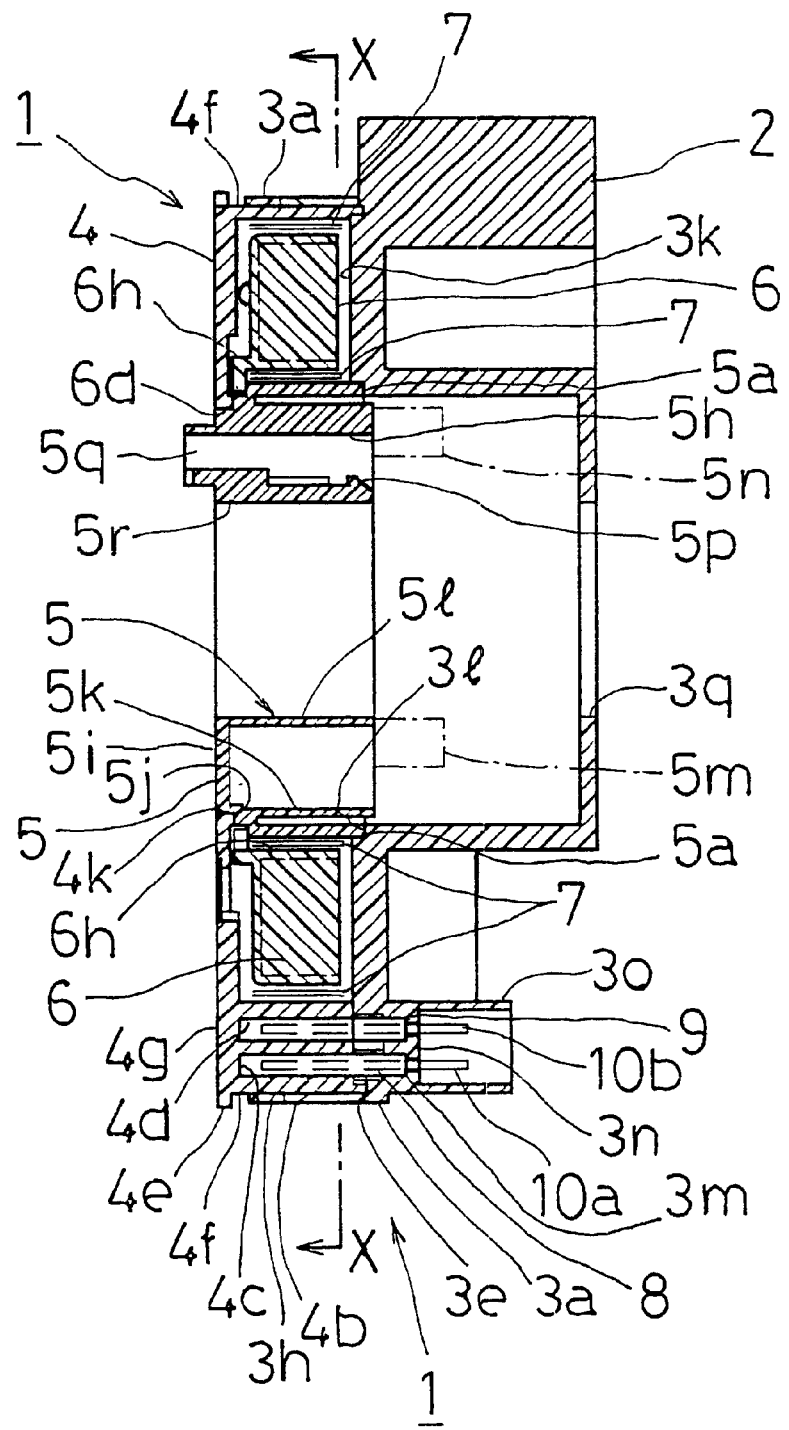
FIG. 3 is a central longitudinal section for showing a first preferred embodiment of the present invention.

At the upper surface of the bottom surface 3k, as shown in FIG. 3, are arranged the flat cable 7, the case 4 having one end of the flat cable 7 supported, the rotor 5 for supporting the other end of the flat cable 7, and the floating member 6. It may also be applicable that the smooth sheet for reducing a frictional resistance is arranged on the bottom surface 3k.

As shown in FIG. 1, the case 4 is a substantial ringlike resin housing comprised of a side plate 4f having a plurality of claws 4b and protrusions 4e formed at upper right and left locations of the claws 4b; and an upper plate 4g continuously formed with the side plate 4f. The rotary connector 1 constitutes a fixing case by the case 4 and the stator housing 3a of the base 3.

As shown in FIGS. 1 and 5, the upper plate 4g is provided with a first caution label 11 and a neutral position display window 4h. The display window 4h is comprised of a through-pass hole to which the transparent member 13 formed by transparent acrylic plate and the like is fitted. A first mark 6a for use in displaying the neutral position described in the floating member 6 appears as shown in FIG. 5 when the steering wheel is kept at its neutral state where a vehicle runs straight in a forward direction, and a second mark 5b described in the rotor 5 is positioned to be faced against the first mark 6a.

The transparent member 13 is engaged in one finger-touch operation by holding a plurality of protrusions 4l and supporting segments 4j formed at the edge of the display window 4h. As shown in FIG. 5, the transparent member 13 mounted at the display window 4h is made such that the circumference of the transparent member 13 is held by the edge of the display hole 11a of the first caution label 11 and can be prevented from being dropped by overlapping the edge of the display hole 11a cut and formed at the first caution label 11 to the outer circumference of the transparent member 13. The transparent member 13 is formed to be larger than the display hole 11a and when the first caution label 11 is adhered to the surface of the upper plate 4g of the case 4, it is attached in such a way that the display hole 11a overlaps around the transparent member 13.

Further, the transparent member 13 may be mounted for preventing dust. However, the transparent member 13 can be eliminated. In addition, a degree of transparency of the transparent member 13 is sufficient in such a degree as one in which the first mark 6a can be visually acknowledged and a colored semi-transparent member may be also applied.

The upper plate 4g of the aforesaid case 4 can be formed by transparent resin material and the first mark 6a arranged below the upper plate 4g can always be acknowledged in a visual manner. Then, the first mark 6a is set as a scale for expressing the number of rotation of the rotor 5, thereby it can be displayed in such a way that how many times the rotor 5 is rotated in leftward or rightward direction can be acknowledged at a glance.

The display window 4h of the case 4, the first mark 6a of the floating member 6 and the second mark 5b of the rotor 5 are arranged at optional positions where they are in the same line to each other when the steering wheel and the rotary connector 1 are set at their neutral positions.

The first mark 6a is comprised of one where it is directly formed at the floating member 6, a printed mark or an adhered seal and the like. As shown in FIGS. 1 and 5, the second mark Sb is a printed one on the second caution label 12. Further, the second mark 5b is comprised of one where it is directly formed at the rotor 5, a printed mark or an adhered seal and the like. As shown in FIGS. 1 and 5, the first and second marks 6a, 5b may be of a triangular or a scale expressing the rotational angle and the number of rotation of the steering wheel. With such an arrangement as above, appearing of the first and second marks 6a, 5b at the display window 4h enables a worker to judge whether or not the steering wheel is set at a neutral position.

In addition, the first mark 6a may be comprised of a plurality of a mark for displaying the neutral position of the steering wheel, a mark for displaying the first turn of right or left direction of the steering wheel and a mark for displaying the second turn of right or left direction. With such an arrangement as above, appearing of the first and second marks 6a, 5b at the display window 4h enables a worker to judge that the steering wheel is placed at the neutral position or if the scale is applied as described above, to judge how many times the steering wheel is turned in either the rightward or leftward and to judge in what rotating angle the steering wheel is set.

Figure 7:
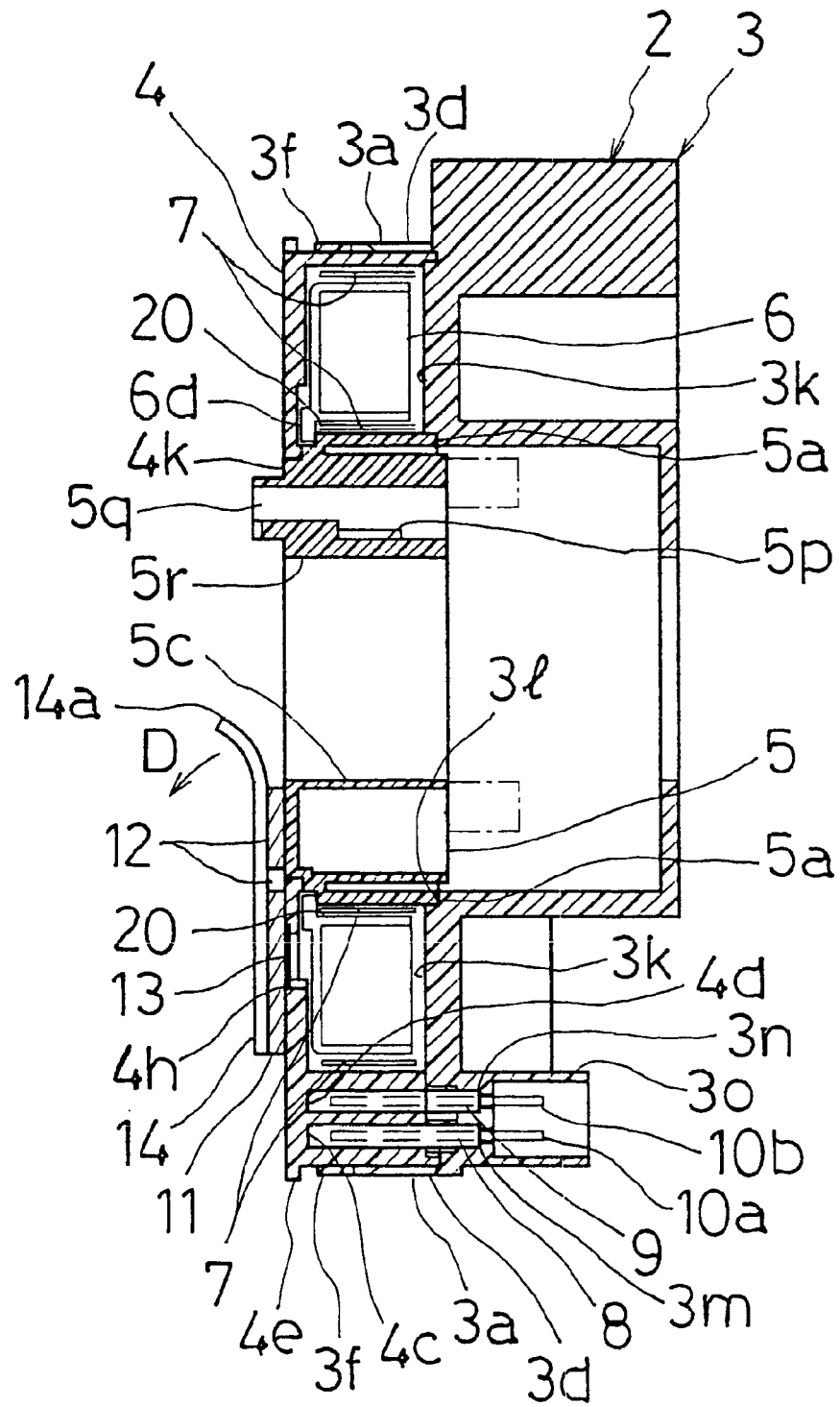
FIG. 7 is a central longitudinal section for showing a first preferred embodiment of the present invention where the caution label separator is peeled from the rotary connector.

The first and second caution labels 11, 12 show that the rotary connector 1 should be held at the neutral position in compliance with the position of the steering wheel where the vehicle advances in straight forward, wherein at first, as shown in FIGS. 6 and 7, fan-shaped first and second caution labels 11, 12 are arranged in substantial triangular form and adhered to the triangular shaped caution label separator 14.

Figure 8:
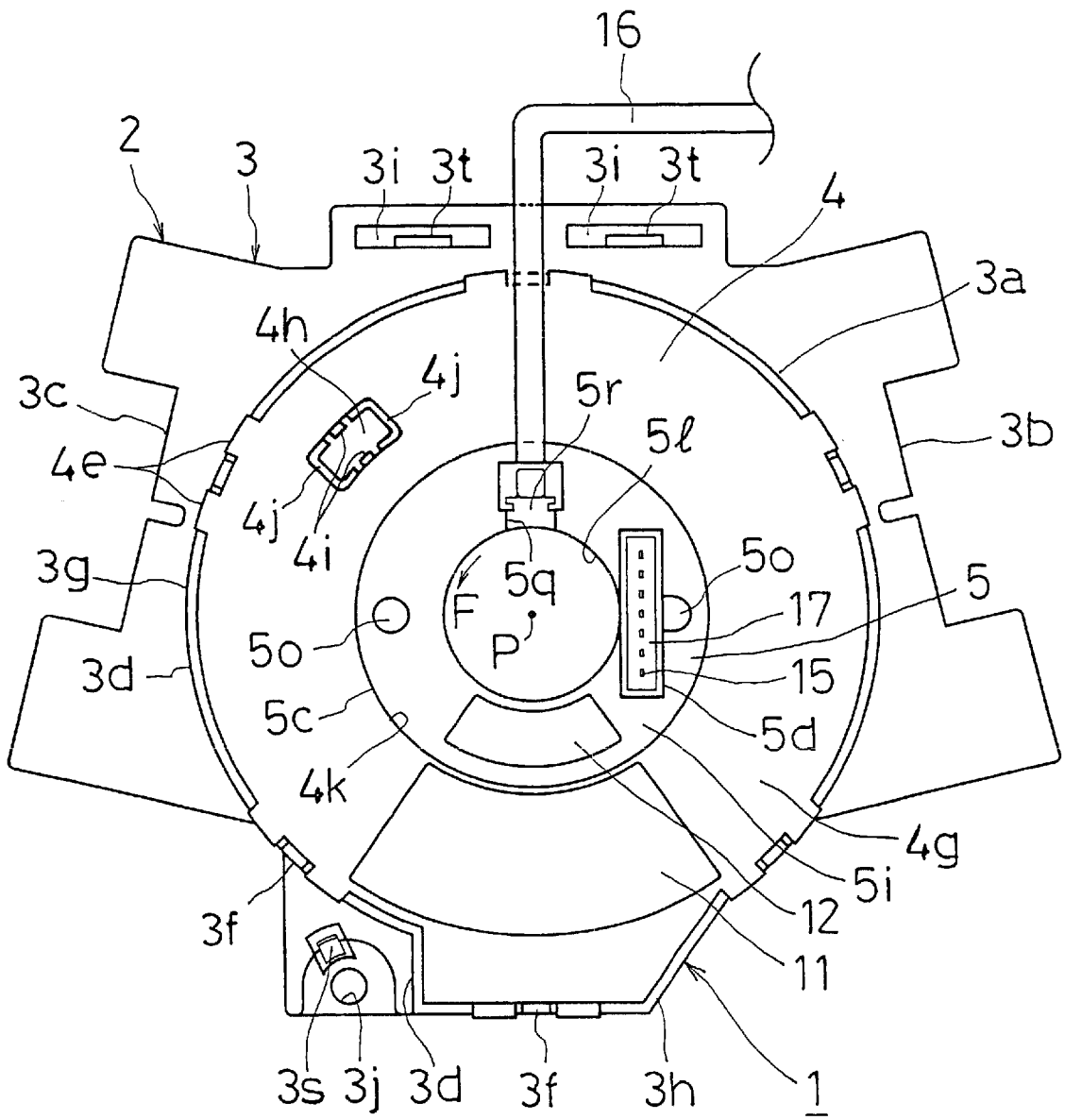
FIG. 8 is a top plan view for showing another preferred embodiment of a rotary connector in a first caution label of the present invention where the caution label separator is peeled from the rotary connector.

The first and second caution labels 11, 12 may act as seal indicating caution describing some caution items when the rotary connector 1 is mounted. As shown in FIG. 8, the caution label separator 14 may also act as the temporary stopping member for temporarily stopping the rotor 5 kept at its neutral state against the case 4 to prevent from being rotated by adhering the first and second caution labels 11, 12 adhered to the caution label separator 14 against the upper surface of the rotary connector 1.

The caution label separator 14 is adhered to the surface side having some cautions of the first and second caution labels 11, 12 under a state in which it is peeled off in a relative easy manner. The caution label separator 14 is formed by the transparent member made of vinyl or cellophane tape and the like in which the characters in the first and second caution labels 11, 12 can be visually acknowledged. The first and second caution labels 11, 12 have adhesive agents at the surfaces adhered to the rotor 5 and the case 4.

Although, as shown in FIG. 6, shape of the caution label separator 14 is a substantial triangular shape, for example, if it can be adhered concurrently to the rotor 5 and the case 4 together with the first and second caution labels 11, 12, its shape is not particularly restricted. s shown in FIGS. 6 and 7, the caution label separator 14 has no labels adhered between the first caution label 11 and the second caution label 12 and at the protruded segment 14a. It is suffice to select proper shape of the caution label separator in compliance with the number of items in cautions of the rotary connector and shape of upper surface of the rotary connector 1.

It is satisfactory that the first caution label 11 has such a shape as one in which it can be adhered to the upper plate 4g of the case 4 as shown in FIG. 8 when the caution label separator 14 is adhered to the rotary connector 1 together with the second caution label 12, and the shape is not limited to a fan-shape. It is satisfactory that the second caution label 12 has such a shape as one in which it can be adhered to the upper surface 5i of the rotor 5 when the caution label separator 14 is adhered to the rotary connector 1 together with the first caution label 11, and the shape is not limited to a fan shape.

When the first and second caution labels 11, 12 are adhered to the rotary connector 1, at first the rotor 5 is set at its neutral position, the first caution label 11 adhered to the caution label separator 14 is aligned with the upper plate 4g of the case 4 and the second caution label 12 is aligned with the upper surface 51 of the rotor. 5 and adhered.

As shown in FIG. 6, the caution label separator 14 is adhered to the rotary connector 1 under a state in which the axial center P of the rotary connector 1 is set in the axial barrel 5c of the rotor 5 and the protruded section 14a is extruded out. With such an arrangement as above, the rotor 5 rotatably arranged is fixed to the case 4 under a state of neutral position. The rotary connector 1 is transported and stored under a state shown in FIG. 6 just before it is mounted at the steering wheel segment.

Then, when the rotary connector 1 is fixed to the steering wheel segment, the extruded segment 14a is pulled in an arrow direction D as shown in FIG. 7 to cause the caution label separator 14 to be peeled off and the rotor 5 or the floating member 6 can be rotated, resulting in that the rotary connector 1 is mounted at the steering wheel segment.

The caution label separator 14, the first and second caution labels 11, 12 and the display window 4h are mounted at separate positions to each other as shown in FIG. 8, and even if the display hole 11a of the first caution label 11 is not present, function of the rotary connector 1 is not changed.

As shown in FIG. 4, the terminal installing segments 4c, 4d are present at lower surface corners of the case 4, and the fixing terminals 8, 9 fixed to the ends of the flat cables 7a, 7b are installed at the terminal installing segments 4c, 4d. The flat cable 7 is comprised of two flat cables 7a, 7b in which a plurality of band-like conductor wires are spaced apart by a desired distance, for example, and two resin films made of insulating resin are heated and press fitted to each other. The flat cable 7a is set such that its one end is connected to the terminal 10a in the connector segment 3o of the base 3 and the other end is connected to the terminal 15 in the connector segment 5d of the rotor 5. The flat cable 7b is set such that its one end is connected to the terminal 10b in the connector segment 3o of the base 3 and the other end is connected to a harness 16 arranged at the rotor 5.

As shown in FIG. 4, the flat cable 7 is stored in the donut-shaped storing space A formed by the stator housing 3a of the base 3, the case 4 and the rotor 5 together with the floating member 6 from the neutral position where the automobile runs straight in a forward direction in such a way that the steering wheel can be turned by more than two turns, for example, three times for both right and left directions. The flat cable 7 is comprised of two flat cables 7a, 7b. However, the flat cable 7 can be constituted by one flat cable or more than two flat cables in response to the number of terminals in an electric circuit installed at the steering wheel.

As shown in FIG. 4, the flat cables 7a, 7b are wound in a winding space B between the side plate 4f of the case 4 and the floating member 6 in a direction of arrow E from the terminal installing segments 4c, 4d of the case reversed at the reversing segments 6b, 6c of the floating member 6 in a direction of arrow F and wound in a winding space C between the axial cylindrical segment 5c of the rotor 5 and the floating member 6.

As shown in FIG. 4, the flat cables 7a, 7b at the rotor 5 enter the rotor 5 at the guide grooves 5e, 5f formed to extend substantially along a direction of arrow F around the outer circumference of the rotor 5, and the movable terminals 17, 18 are fixed at the terminal installing segments 5g, 5h.

The terminal 17 is set such that the terminal 15 connected to the flat cable 7a is inserted and the terminal 15 is arranged in the connector segment 5d of the rotor 5. The terminal 18 is set such that a terminal (not shown) connected to the flat cable 7b is inserted and the terminal is connected to the harness 16 pulled out of the upper surface 5l of the rotor 5.

As shown in FIG. 4, the harness 16 is inserted from the movable terminal 18 mounted at the lower surface of the rotor 5 through a vertical groove-like cord insertion segment 5q formed at the inner wall of the axial insertion segment 5l of the rotor 5 and pulled out to the upper surface 5i of the rotor 5. The cord insertion segment 5q is communicated with the axial insertion segment 5l for facilitating to arrange the harness 16 having the connector 16a shown in FIG. 1. The cord insertion segment 5q is set such that the lateral lid 5r is fitted to the vertical groove 5s and the axial insertion segment 5l into which the steering shaft is inserted and installed is formed into a complete cylindrical shape.

A mating connector installed at the lower surface of the steering wheel is fitted to the connector 16a installed at the end part of the harness 16 and the connector 5d of the rotor 5, and further it is connected to an automatic transmission shift-up/shift-down switch installed in the steering wheel, an ASCD (Automatic Speed Control Device) switch, a horn switch or an audio-switch and the like.

As shown in FIGS. 1 and 5, the rotor 5 is a substantial ring-like resin electrical connector in which an engaging pin 5o fitted to a notch formed at the lower surface of the steering wheel is protruded and formed at the upper surface 5i, the engaging pin 5o and the connector 5d are engaged with the steering wheel, thereby they are rotated together and they are electrically connected. A first step 5j slidably engaged with an inner edge 4k of the case 4 and a second step 5k with which an engaging piece 6d protruded from an inner upper end of the floating member 6 toward the axial center P is rotatably engaged are cooperatively arranged around the upper surface 5l.

The cancel pins 5m, 5n rotatably inserted into the cylindrical segment 3p of the base 3 are protruded and formed at the lower surface of the rotor 5. For example, in the case that an operating lever for the turn signal switch is oscillated to either the leftward or rightward supporting position and the steering wheel is turned in a direction opposite to the operating direction of the operating lever, the cancel pins 5m, 5n of the rotor 5 are abutted against the cancel cam of the turn signal switch to cause the cancel cam and the operating lever to be returned automatically back to their original OFF positions. Since the cancel pins 5m, 5n of the rotor 5 constitute one member of the cancel mechanism of the turn signal switch, mounting of the cancel pins at the turn signal switch can be eliminated, resulting in that the number of component parts or the number of assembling steps can be reduced.

The rotor 5 forms an axial cylindrical segment 5c at its outer surface comprised of the guide grooves 5e, 5f, and forms a cylindrical axial insertion segment 5l at its inner wall surface into which a steering shaft (not shown) is inserted. The axial insertion segment 5l has the same diameter as the inner diameter of the axial insertion hole 39 formed at the axial center P of the base 3 and this segment is arranged in opposition to the axial insertion hole 3q.

The rotor 5 forms each of the terminal installing segments 5g, 5h to which each of the movable terminals 17, 18 having one end of a plurality of flat cables 7a, 7b fixed thereto is installed. The terminal installing segment 5g is formed continuously at the connector segment 5d, its inner wall is formed with an engaging segment to which the claw 17a of the movable terminal 17 shown in FIG. 1 is fitted, or the groove into which the guide Protrusion 17b is inserted. The terminal installing segment 5h forms an engaging segment to which the claw 18a of the movable terminal 18 shown in FIG. 1 is fitted or a groove into which the guide protrusion 18b is inserted.

The movable terminals 17, 18 feed out each of the flat cables 7a, 7b from the guide grooves 5e, 5f formed in equal-spaced apart relation at the outer circumferential segment of the rotor 5 as shown in FIG. 4 into the winding space C arranged between the rotor 5 and the floating member 6. When there are provided two flat cables 7, the guide grooves 5e, 5f are set such that the guide groove 5e is installed at the opposite side of the guide groove 5f in opposition by 180o. For example, when three flat cables 7 are used, the guide grooves 5e, 5f are formed to be equally spaced apart by 120o. Then, the floating member 6 is provided with reversing segments 6b, 6c of which number corresponds only to the number of flat cables 7a, 7b, and the reversing segments 6b, 6c are equally spaced apart in the same manner as that of the guide grooves 5e, 5f of the rotor 5.

As shown in FIG. 4, the floating member 6 is a substantial ring-like resin rotor having many punched holes 6e at its lower surface. The floating member 6 is suspended from the rotor 5 with the engaging piece 6d being engaged with the second step 5k of the rotor 5, and its lower end is floated from the bottom surface 3k of the base 3 as shown in FIG. 3. Many curved segments 6f are formed at the outer wall surface 6g of the floating member 6 so as to reduce a frictional resistance when the flat cables 7a, 7b are slidingly contacted with it.

As shown in FIG. 1, a smooth sheet 20 for reducing a frictional resistance when the flat cables 7a, 7b are slidingly contacted with it is adhered to the inner wall surface 6h at the axial center P of the floating member 6. The surface of the smooth sheet 20 is integrally formed with a plurality of ring-like protrusions 20a. The inner wall surface 6h may be integrally formed with an emboss (not shown) comprised of a plurality of fine ring-like protrusions in place of the smooth sheet 20.

As shown in FIGS. 1, 2 and 4, the upper surface 61 of the floating member 6 is formed with a plurality of resilient pieces 6j formed by punching out and forming U-shaped grooves in a radial outward direction from the axial center P. A location near the extremity end of each of the resilient pieces 6j is formed with a semi-spherical protrusion 6k for reducing a frictional resistance when an inner ceiling surface of the case 4 is contacted. With such an arrangement as above, when the floating member 6 is oscillated and rotated, the protrusion 6k of the resilient piece 6j is abutted against the inner ceiling surface of the case 4 to prevent the oscillating member 6 from being oscillated and to make a smooth rotation of it.

The preferred embodiment of the present invention is comprised of the aforesaid configuration and its operation will be described in detail. As shown in FIG. 5, the rotary connector 1 is operated such that when it is in a neutral position, the first mark 6a of the floating member 6 appears in the display window 4h of the case 4 to display that the rotary connector 1 is kept at its neutral state.

Under this neutral state, the caution label separator 14 is adhered to the case 4 and the upper surface of the rotor 5 as shown in FIG. 6. Under this state, the rotary connector 1 is transported and delivered. The rotary connector 1 is set such that the rotor 5 is temporarily fixed to the case 4 by the caution label separator 14, even if a person touches this or even if vibration is applied to it, the rotor 5 is not rotated and its neutral state can be kept.

Then, the caution label separator 14 is peeled off as shown in FIG. 7 by pulling the extruded portion 14a in an upward direction of the arrow D when the rotary connector 1 and the combination switch 2 are assembled to the steering wheel or the steering wheel is assembled. The caution label separator 14, the first and second caution labels 11, 12 may also act as a caution for installation and the holding member for holding the neutral state of the rotary connector 1, so that a look member used in the prior art rotary connector can be eliminated, and the number of component parts as well as its cost can be reduced.

When the steering wheel having the rotary connector 1 or the like completely assembled thereto is operated to turn in a leftward direction, for example, the rotor 5 having the engaging pin 5o engaged with the steering wheel and rotated together with it is turned in a direction of an arrow F. Since the first step 5j at the upper end outer circumference is axially aligned with the inner edge of the case 4, the lower circumferential edge 5a is axially aligned with the step 31 of the base 3 and two cancel pins 5m, 5n are axially aligned with the cylindrical segment 3p, the rotor 5 is rotated stably without being oscillated.

The flat cables 7a, 7b having one end fixed to the rotor 5 are moved while being pulled by the rotor 5. The flat cables 7a, 7b kept in the winding space C are wound around the rotor 5 and the flat cables 7a, 7b kept in the winding space B are moved from the floating member 6 while being unwound. Under motion of the flat cables 7a, 7b, the floating member 6 hooked at the folding-back of the reversing segments 6b, 6c is pulled by the flat cables 7a, 7b and it is rotated in decelerated state in the same direction of arrow G as that of the rotor 5.

As shown in FIGS. 3 and 7, since the floating member 6 is rotated in the same direction as that of the rotor 5 under a state in which it is floated above the bottom surface 3k in such a way that the engaging piece 6d is suspended at the second step 5k at the upper end outer circumferential segment of the rotor 5, its sliding resistance is low. In addition, since the floating member 6 has no transmission mechanism such as a gear between the rotor 5 and the case 4, its frictional resistance is low and its smooth turning is assured.

Although the flat cable 7 is wound in the rotary connector 1 in such a way that it can be turned by about three times in both rightward and leftward directions, if it is installed at the steering wheel, it is rotated by two times in both rightward and leftward directions in the same manner as that of the steering wheel. When the rotor 5 is rotated in the rotary connector 1, the second mark 5b arranged at the upper surface 5l of the rotor 5 is moved, so that it becomes apparent that the rotor 5 has been rotated. However, since the second mark 5b returns to its original position after it is rotated from the neutral position by one or two times of rotation, it cannot be judged only with the second mark 5b how many times the rotor 5 is rotated.

When the rotor 5 is rotated, the floating member 6 is turned in the same direction. Then, the first mark 6a arranged at the upper surface 5l of the floating member 6 is hidden and is not seen at the display window 4h as the floating member 6 is turned, and the fact that the rotary connector 1 has been rotated can be acknowledged by the display window 4h and the first mark 6a seen or hidden repeatedly. Then, as the rotor 5 is wound again to its neutral position, the first mark 6a appears at the display window 4h, so that the neutral state of the rotor can be acknowledged by the first mark 6a and the second mark 5b, and erroneous assembling of the rotary connector 1 can be prevented.

(Second Preferred Embodiment)

Figure 9:
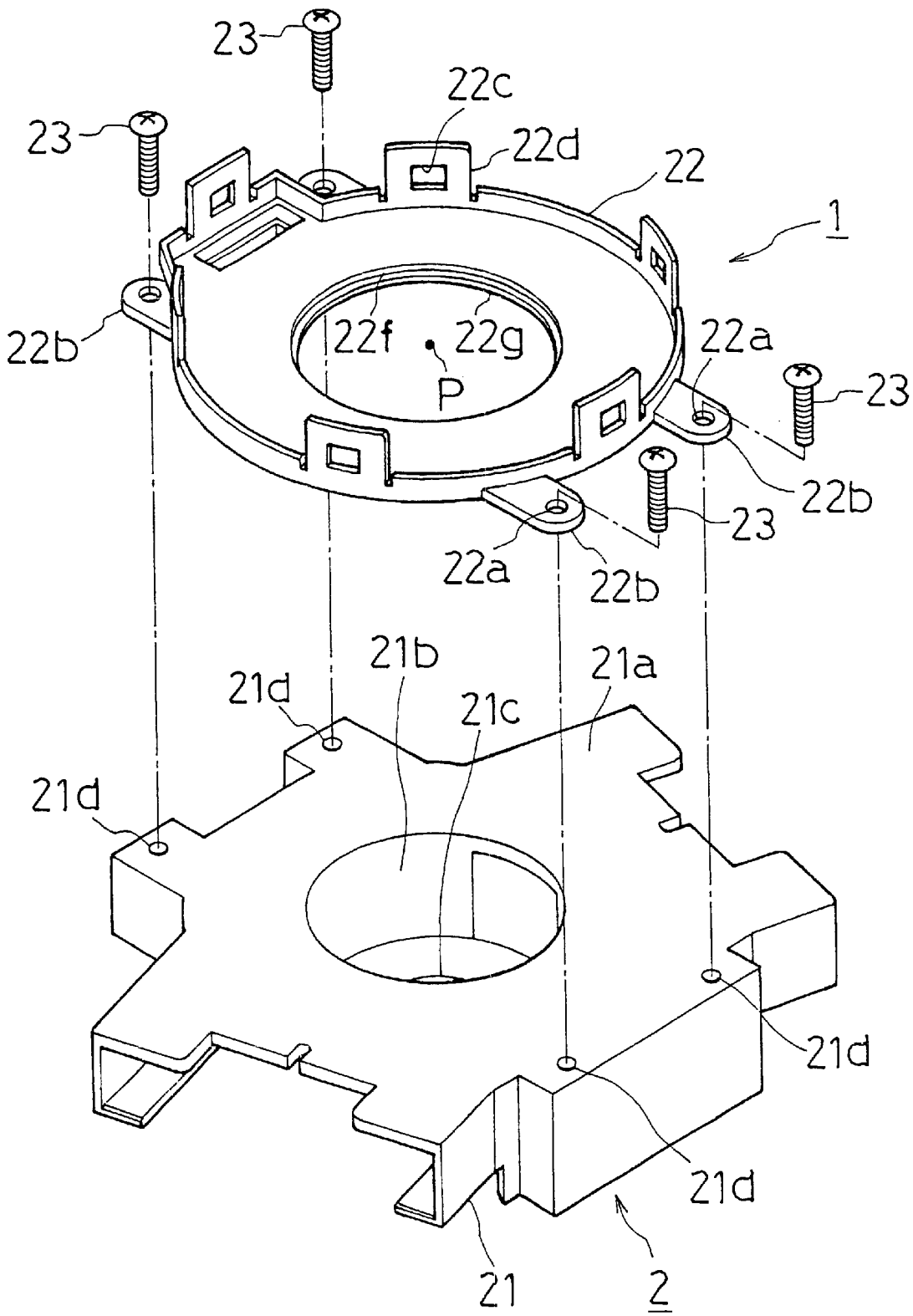
FIG. 9 is an exploded perspective view for showing a combination switch and a stator housing in a second preferred embodiment of the present invention.

FIG. 9 is an exploded perspective view for showing a substantial part of a second preferred embodiment of the present invention. The second preferred embodiment of the present invention is made such that a base 21 of a combination switch 2 and a stator housing 22 of the rotary connector 1 are separately arranged. The same component parts as those of the first preferred embodiment are denoted by the same reference numerals and their description is eliminated. In addition, each of the component elements not shown in FIG. 9 is all the same as those of the first preferred embodiment and their description will be eliminated.

The stator housing 21 is made such that an ear 22b having a through-pass hole 22a into which a screw 23 is inserted and passed is integrally formed with resin in order to fix it to the upper surface 21a of the base 21 with screws.

The stator housing 22 is made such that an engagement piece 22d having an engaging hole 22c engaged with the claw 4b formed at the aforesaid case 4 is integrally formed. Inside the engaging piece 22d is integrally formed with a bottom plate 22e. A location near the inner edge 22g of the bottom plate 22e is formed with a step 22f to which the lower circumferential edge of the rotor 3 is rotatably fitted.

At the central part of the base 21 is present the cylindrical notch 21b having the same inner diameter as that of the inner edge 22g, and within the notch 21b are inserted a cancel rotor (not shown) for the turn signal switch and a coil spring for biasing the cancel rotor toward the steering wheel. At the bottom surface of the notch 21b is formed a through-pass hole 21c into which the steering shaft is inserted.

In the case that the cancel pins 5m, 5n are formed at the lower surface of the rotor 5 in the first aforesaid preferred embodiment and the rotor 5 may act as the cancel rotor, the cancel rotor can be eliminated.

The rotary connector 1 in the second preferred embodiment shows the same action as that described in detail in the first preferred embodiment and its description will be eliminated. The rotary connector 1 is made separate from the base 21 of the combination switch 2 to enable it to be easily mounted at the base of general-purpose type combination switch.

(Third Preferred Embodiment)

Figure 10:
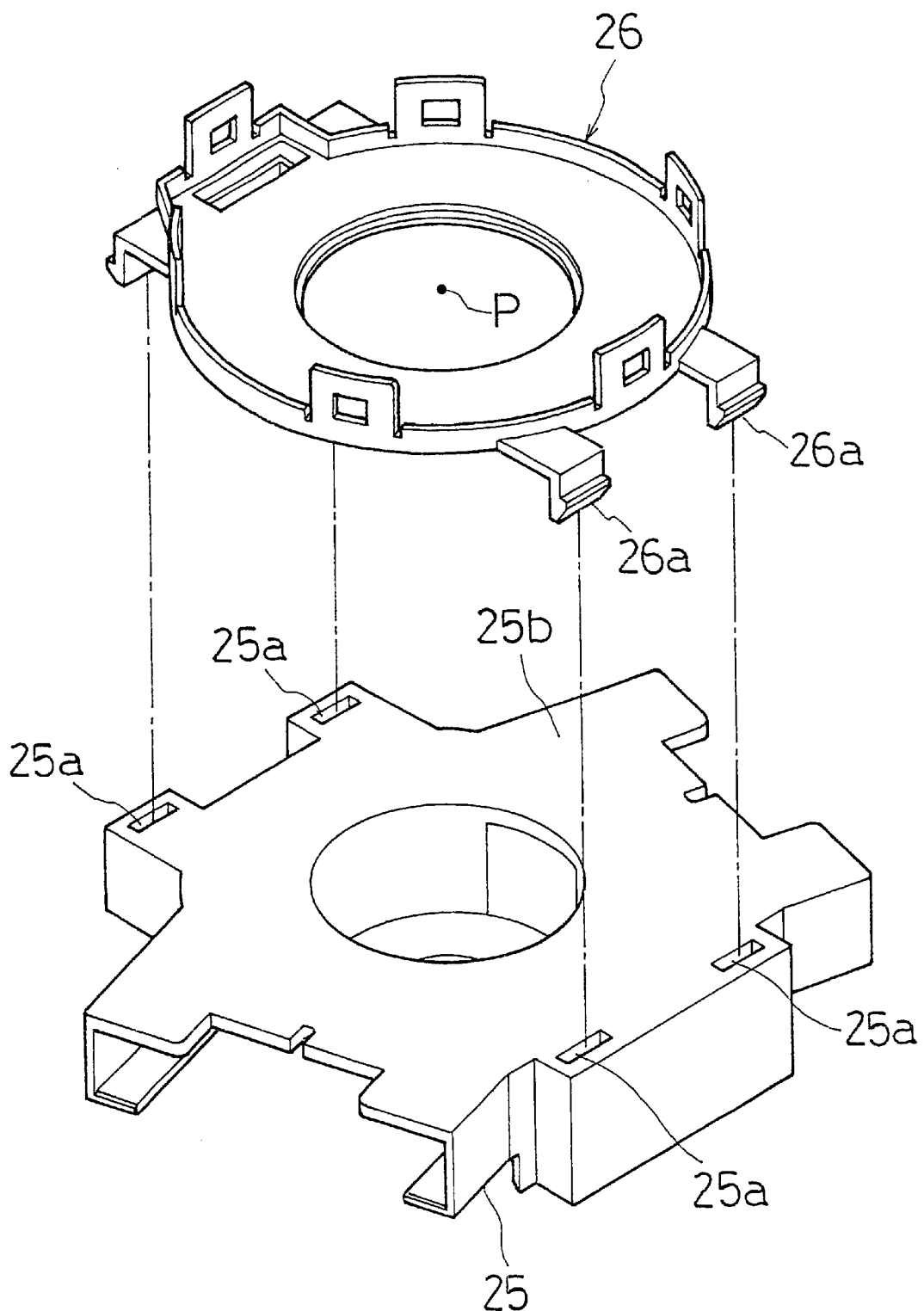
FIG. 10 is an exploded perspective view for showing a combination switch and a stator housing in a third preferred embodiment of the present invention.

FIG. 10 is an exploded perspective view for showing a substantial part of a third preferred embodiment of the present invention. The third preferred embodiment of the present invention is means for fixing the stator housing 26 of the rotary connector 1 separate from the base 25 to the base 25 of the combination switch 2 in one finger-touch operation by a plurality of resilient engaging pieces 26a. The same component parts as those of the first and second preferred embodiments are denoted by the same reference numerals and their description will be eliminated. Each of the component parts not shown in FIG. 1 is all the same as those of the first and second preferred embodiments and its description will be eliminated.

The stator housing 26 is integrally formed with the resilient engaging piece 26a being faced downwardly to be engaged with the engaging hole 25a punched at the corner of the upper surface 25b of the base 25.

The rotary connector 1 in the third preferred embodiment is made separately from the base 25 of the combination switch 2 and can be arranged in one-finger touch operation to the base of the general-purpose type combination switch.

Since the present invention has the aforesaid constitution and action, the following effects can be attained. The invention includes stator housings installed at a chassis side of a vehicle; a case arranged at the stator housings; a rotor rotatably mounted at the stator housings and connected to a steering wheel; a floating member rotatably engaged with an outer circumferential part of the rotor and rotatably arranged above bottom surfaces of the stator housings; and a wound flat cable of which one end is fixed to the rotor, the other end of which is fixed to the case and intermediate part of which is passed through reversing parts formed in the floating member and reversed, so that the floating member is engaged with the rotor rotated in the same direction and suspended at the upper location of the bottom surface of the stator housing. As a result, sliding resistance where the floating member is slidingly contacted is reduced, its motion is smooth, a sliding sound is prevented from being generated, a load applied to the flat cable can be reduced, and its durability is improved.

The floating member has a plurality of protruded engaging pieces formed inwardly at an upper end of an inner wall surface, and the engaging pieces are rotatably engaged with the rotor, so that a contact area where the floating member is slidingly contacted with the rotor is reduced, a sliding resistance between both members is reduced and the floating member can be easily rotated with a weak force. With such an arrangement as above, the floating member can be smoothly cooperated with the flat cable moved in response to normal rotation and reverse rotation of the rotor even under such a degree as one in which the flat cable is inserted into the reversing segment, its winding direction is reversed and slightly engaged with the reversing segment. In addition, it becomes possible to make a shape of the engaging piece into a simple plate shape or rod shape in such a degree as one in which it is mounted on the upper surface of the outer periphery of the rotor and either the assembling work of the rotary connector or its structure can be made simple.

The rotor is formed at an upper side outer circumferential end with a first step to which an inner edge of a hole formed in the case is fitted and the lower part of the first step is formed with a second step to which the engaging piece of the floating member is rotatably engaged, so that the engaging piece of the floating member engaged with the rotor is prevented from being dropped from the second step, the engaging piece is prevented from being loosed in a vertical direction through supporting of the second step and the case arranged at the first step on the second step.

The rotor has an axial insertion segment passing through a steering shaft formed at the axial center side, a cord insertion segment having a harness passing along the axial center side line formed at the inner wall of the axial insertion segment, and having at its lower surface a terminal installing part for installing a movable side terminal fixed to one end of the flat cable; the movable side terminal is connected to one end of the harness having a connector; and the harness has the other end passed through the cord insertion segment and has a wire arranged at an upper surface of the rotor, and a lateral lid is installed the axial center side of the cord insertion segment, so that the harness having the connector and its one end fixed to the lower surface of the rotor can be arranged easily on the upper surface of the rotor and the harness can be prevented from being extruded out into the axial insertion segment and further prevented from being contacted with the steering shaft.

The floating member has a smooth sheet for reducing sliding resistance or emboss at the inner wall surface where the rotor is inserted, so that a sliding resistance between the floating member and the rotor is reduced, a smooth turning of the floating member can be attained and at the same time, sliding sound can be eliminated.

The case is comprised of a side plate having a claw to which an engaging hole of an engaging piece formed at the stator housing is engaged; and an upper plate arranged above the floating member so as to cover the floating member, so that the stator housing can be fixed at a specified position in one-finger touch operation to the case without using any screw at all.

The stator housing is integrally formed with a base of a combination switch, so that the number of component parts, the number of assembling steps, the number of component parts management steps, and amount of resin material forming the base or stator housing can be reduced and their costs can be reduced.

The base is made such that the upper surface of the base may also act as the bottom surface of the stator housing of the rotary connector, and an engaging piece having an engaging hole to which a claw of a side plate of the case is engaged is integrally formed around the bottom surface of the base, so that the bottom surface of the stator housing may also act as the upper surface of the base, the number of component parts, the number of assembling steps, the number of component parts management steps, and amount of resin material forming the base or stator housing can be reduced and their costs can be reduced. The case of the rotary connector can be fixed to the base of the combination switch in one finger touch operation without using any screw at all.

The base is made such that an enclosure to which the lower end of the case is fitted is integrally formed around the bottom surface, so that the case can be fixed to the base enclosure while its entire circumference is fitted to the base enclosure, the case can be prevented from being moved in a lateral direction and its looseness may also be prevented.

The case is made such that terminal installing segments installing fixed side terminals having one end of the flat cables fixed thereto are formed at a circumferential part of the case; and the fixed side terminals are made such that the terminals are insert molded, lower locations are fitted to insertion holes punched at the stator housing, and the terminals are arranged in the connector formed at the base, so that the fixing side terminal mounted at the end part of the flat cable can be installed easily at the terminal installing segment of the case, the case is assembled to the base to enable the case to be inserted at the specified position in the connector segment in the case and no screw fastening work facilitates assembling work.

The rotor is formed with terminal installing segments installing movable side terminals having one end of the flat cables fixed thereto; and the movable side terminals are made such that the terminal is insert molded and the terminal is arranged in the connector segment formed in the rotor, so that the movable side terminal mounted at the end segment of the flat cable can be installed easily at the terminal installing segment of the rotor, the terminal can be inserted into the predetermined position in the connector of the rotor and non-required screw fixing work facilitates the assembling work.

The rotor forms each of terminal installing segments installing each of movable side terminals having one end of a plurality of flat cables fixed thereto; the movable side terminals are made such that each of the flat cables is guided out into a winding space arranged between the rotor and the floating member at an outer circumferential segment of the rotor through equal space; and the floating member is provided with reversing segments only by the number of flat cables and at the same time the reversing segments are equally spaced apart, so that the floating member is set such that the flat cables are equally spaced apart and fixed at the rotor acting as a rotating source, the floating member can be pulled, pushed and rotated by the reversing segments equally spaced apart and formed with the result that the turning of the floating member can be changed into rotation having no oscillation and a frictional resistance between the floating member and the rotor can be reduced.

The rotor forms cancel pins abutting against a-cancel cam of a turn signal switch so as to cause an operating lever to be automatically moved, so that the cancel rotor of the combination switch may also act as the rotor of the rotary connector, the number of component parts, the number of assembling steps, and amount of resin material can be reduced and their costs can be reduced with the result that the cancel rotor may also act as the rotor to reduce their occupying volume and a size of the combination switch having the rotary connector can be reduced.

The stator housing is integrally formed with a protruded ear having a through-pass hole where a screw is inserted and passes at its circumferential segment; and the base of the combination switch is formed with a threaded hole having the screw threadably engaged with it and the stator housing is threadably stopped, so that the rotary connector can be fixed with screws to the bases of all kinds of combination switches of a vehicle requiring the rotary connector.

The stator housing is integrally formed with an engaging piece engaged with an engaging segment formed at the base of the combination switch and is fixed to the base with the engaging piece.

The case and the rotor are set such that the case and the rotor are temporarily set with a caution label separator when the rotor is placed at a neutral position; and the caution label separator has a first caution label adhered to the upper plate of the case and a second caution label adhered to the upper surface of the rotor, so that the caution label can be applied as an operation caution of the rotary connector and a fixing member for temporarily fixing the either the rotor or the flat cable at the neutral position, the rotary connector can be kept at the neutral state without utilizing any special fixing component parts with the result that the number of component parts can be reduced and their cost can be reduced. In addition, since the aforesaid any special fixing component parts for use in fixing the rotor are not required, a box for storing the rotary connector and delivering it can be reduced in size and its weight can be reduced, its transporting characteristic can be improved and cost for the box can be reduced.

The first and second caution labels have descriptions about fixing of the rotary connector; the caution label separator is of a transparent member or an opaque element adhered to the first and second caution labels, the separator is peeled off when the rotary connector is assembled to a chassis to cause the rotor to be rotatable, so that even if the first and second caution labels are covered by the caution label separator to keep the rotor in its unrotatable state, both first and second caution labels can be acknowledged visually. Since the caution label separator for fixing the rotor is thin in its thickness like a label, its mounting space is scarcely required and it is not protruded with the result that it may be transported easily during its transportation and the case for storing the product can be reduced in its size.

The floating member and rotor have a first mark and a second mark oppositely faced to each other when the rotary connector is placed at a neutral position; and the case is formed by non-transparent member and the first mark of the floating member arranged below the case forms a display window visually acknowledged, so that it is possible to provide a rotary connector having a simple structure where the first mark appears at the display window under a neutral state when the first mark is turned without using any gear mechanism and non-utilization of the gear mechanism enables the size of the rotary connector to be reduced in its thickness and its weight to be reduced. In addition, acknowledgement of the neutral position with the first mark and the second mark can always be performed at the time of shipment of the product of the rotary connector, assembling of it to a vehicle and also assembling again of it to the vehicle due to its repairing and inspection or the like, with the result that erroneous assembling of the rotary connector mechanism can be prevented completely and reliability in keeping the neutral position at the rotary connector can be improved.

The case has the display window formed with a through-pass hole; and the display window forms a protrusion and a supporting segment at an edge of the through-pass hole and at the same time the transparent member is held by the protrusion and the supporting segment, so that a transparent member can be fixed in one-finger touch operation to the display window, dusts can be prevented from being entered into the through the display window, the dusts can be prevented from being adhered to the turning rotor or flat cables or floating member or the case or stator housing to which these members are slidingly contacted and bad influence applied to their turning operation can be eliminated.

The case adheres the first caution label at the surface of the upper plate; and the first caution label has the display hole formed in compliance with the display window, and the display hole is arranged in compliance with the circumference of the transparent member, so that the display window can be arranged in the first caution label, the surface at the upper plate of the case can be utilized effectively and at the same time the first caution label can be adhered around the transparent member to fix the transparent member and further the transparent member can be prevented from being dropped from the display window.

The floating member and rotor have the first mark and the second mark oppositely faced to each other when the rotary connector is in a neutral position; and the case is comprised of a transparent member where the first mark of the floating member arranged below the case can be visually acknowledged, so that states of the first and second marks indicating each of the members in the case or neutral position and rotating angle can always be acknowledged visually at a glance. Due to this fact, when certain trouble occurs in the rotary connector, the trouble can be confirmed conveniently without decomposing the rotary connector.

Description of the Reference Numerals in the Drawings

1: rotary connector
2: combination switch
3: base
3a, 22: stator housing
3d: enclosure
3r: upper surface
3e: engaging hole
3f: engaging piece
3k, 22e: bottom surface
3m, 3n: insertion hole
3o: connector
4: case
4a: lower end
4b: claw
4c, 4d: terminal installing segment
4f: side plate
4g: upper plate
4h: display window
4l: protrusion
4j: supporting segment
4k: inner edge
5: rotor
5b: second mark
5d: connector
5g, 5h: terminal installing segment
5i: upper surface
5j l : first step
5k: second step
5l: axial insertion segment
5m, 5n: cancel pin
5q: cord insertion segment
5r: lateral lid 6: floating member
6b, 6c: reversing segment
6d: engaging piece
6h: inner wall surface
7, 7a, 7b: flat cable
8, 9: fixing side terminal
10a, 10b, 15: terminal
11: first caution label
11a: display hole
12: second caution label
14: caution label separator
16: harness
16a: connector
17, 18: movable side terminal
20: smooth sheet
21: base
21d: threaded hole
22a: through-pass hole
22b: ear
23: screw
24: transparent member
25: base
25a: engaging segment
26: stator housing
26a: engaging piece
C: winding space
P: axial center

What is claimed is:

1. A rotary connector, comprising:
   stator housings (3a, 22) installed at a chassis side of a vehicle;
   a case (4) arranged at said stator housings (3a, 22);
   a rotor (5) rotatably mounted at said stator housings (3a, 22) and connected to a steering wheel;
   a floating member (6) rotatably engaged with an outer circumferential part of said rotor (5) and rotatably arranged above bottom surfaces (3k, 22e) of said stator housings (3a, 22); and
   a wound flat cable (7) of which one end is fixed to said rotor (5), the other end of which is fixed to said case (4) and an intermediate part of which is
   passed through reversing segments (6b, 6c) formed in said floating member (6) and reversed.

2. A rotary connector according to claim 1, wherein said floating member (6) has a plurality of protruded engaging pieces (6d) formed inwardly at an upper end of an inner wall surface (6h), and said engaging pieces (6d) are rotatably engaged with said rotor (5).

3. A rotary connector according to claim 2, wherein said rotor (5) is formed at an upper side outer circumferential end with a first step (5j) to which an inner edge (4k) of a hole formed in said case (4) is fitted and a lower part of said first step (5j) is formed with a second step (5k) to which the engaging pieces (6d) of said floating member (6) are rotatably engaged.

4. A rotary connector according to claim 1, wherein said rotor (5) has an axial insertion segment (5l) passing through a steering shaft formed at an axial center (P) side, a cord insertion segment (5q) having a harness (16) passing along an axial center side (P) line formed at an inner wall of said axial insertion segment (5l), and having at its lower surface a terminal installing part (4d) for installing a movable side terminal (18) fixed to one end of said flat cable (7),
   said movable side terminal (18) is connected to one end of said harness (16) having a connector (1 6a), and
   said harness (16) has an end passing through said cord insertion segment (5q) and has a wire arranged at an upper surface (5l) of said rotor (5), and a lateral lid (5r) is installed the axial center (P) side of said cord insertion segment (5q).

5. A rotary connector according to claim 1, wherein said floating member (6) has a smooth sheet (20) for reducing sliding resistance or at least one embossment at said inner wall surface (6h) where said rotor (5) is inserted.

6. A rotary connector according to claim 1, wherein said case (4) is comprised of a side plate (4f) having a claw (4b) to which an engaging hole (3e) of an engaging piece (3f) formed at said stator housing (3a) is engaged, and
   an upper plate (4g) arranged above said floating member (6) so as to cover said floating member (6).

7. A rotary connector according to claim 1, wherein said stator housing (3a) is integrally formed with a base (3) of a combination switch (2).

8. A rotary connector according to claim 7, characterized in that said base (3) is made such that an upper surface (3r) of said base (3) may also act as said bottom surface (3k) of the stator housing (3a) of said rotary connector (1), and an engaging piece (3f) having an engaging hole (3e) to which a claw (4b) of a side plate (4f) of said case (4) is engaged is integrally formed around the bottom surface (3k) of said base (3).

9. A rotary connector according to claim 8, wherein the base (3) is made such that an enclosure (3d) to which a lower end (4a) of said case (4) is fitted is integrally formed around said bottom surface (3k).

10. A rotary connector according to claim 8, wherein said case (4) is made such that terminal installing segments (4c, 4d) installing fixed side terminals (8, 9) having one end of said flat cables (7a, 7b) fixed thereto are formed at a circumferential part of said case (4), and said fixed side terminals (8, 9) are made such that terminals (10a, 10b) are insert molded, lower locations are fitted to insertion holes (3m, 3n) punched at said stator housing (3a), and said terminals (10a, 10b) are arranged in a connector (3o) formed at said base (3).

11. A rotary connector according to claim 8, wherein said rotor (5) is formed with terminal installing segments (5g, 5h) installing movable side terminals (17, 18) having one end of said flat cables (7a, 7b) fixed thereto, and
   said movable side terminals (17, 18) are made such that a terminal (15) is insert molded and said terminal (15) is arranged in a connector segment (5d) formed in said rotor (5).

12. A rotary connector according to claim 8, wherein said rotor (5) forms each of terminal installing segments (5g, 5h) installing each of movable side terminals (17, 18) having one end of a plurality of flat cables (7a, 7b) fixed thereto,
   said movable side terminals (17, 18) are made such that each of said flat cables (7a, 7b) is guided out into a winding space (C) arranged between said rotor (5) and said floating member (6) at an outer circumferential segment of said rotor (5) through equal space, and
   the floating member (6) is provided with reversing segments (6b, 6c) only by the number of flat cables (7a, 7b) and at the same time said reversing segments. (6b, 6c) are equally spaced apart.

13. A rotary connector according to claim 7, wherein said rotor (5) forms cancel pins (5m, 5n) abutting against a cancel cam of a turn signal switch so as to cause an operating lever to be automatically moved.

14. A rotary connector according to claim 1, wherein said stator housing (22) is integrally formed with a protruded ear (22b) having a through-pass hole (22a) where a screw (23) is inserted and passes at its circumferential segment, and a base (21) of the combination switch (2) is formed with a threaded hole (21*d*) having said screw (23) threadably engaged with it and said stator housing (22) is threadably stopped.

15. A rotary connector according to claim 1, wherein said stator housing (22) is integrally formed with an engaging piece (26*a*) engaged with an engaging segment (25*a*) formed at a base (25) of a combination switch (2) and is fixed to said base (25) with said engaging piece (26*a*).

16. A rotary connector according to claim 1, wherein said case (4) and said rotor (5) are set such that said case (4) and said rotor (5) are temporarily set with a caution label separator (14) when said rotor (5) is placed at a neutral position, and said caution label separator (14) has a first caution label (11) adhered to an upper plate (4*g*) of said case (4) and a second caution label (12) adhered to an upper surface (51) of said rotor (5).

17. A rotary connector according to claim 16, wherein said first and second caution labels (11, 12) have descriptions about fixing of the rotary connector (1), said caution label separator (14) is of a transparent member or an opaque member adhered to said first and second caution labels (11, 12), the separator is peeled off when said rotary connector (1) is assembled to a chassis to cause the rotor (5) to be rotatable.

18. A rotary connector according to claim 1, wherein said floating member (6) and rotor (5) have a first mark (6*a*) and a second mark (5*b*) oppositely faced to each other when the rotary connector (1) is placed at a neutral position, and said case (4) is formed by non-transparent member and said first mark (6*a*) of said floating member (6) arranged below said case (4) forms a display window (4*h*) visually acknowledged.

19. A rotary connector according to claim 18, wherein said case (4) has said display window (4*h*) formed with a through-pass hole, and said display window (4*h*) forms a protrusion (4*i*) and a supporting segment (4*j*) at an edge of the through-pass hole and at the same time a transparent member (24) is held by said protrusion (4*i*) and the supporting segment (4*j*).

20. A rotary connector according to claim 19, wherein said case (4) adheres a first caution label (11) at a surface of an upper plate (4*g*), and a first caution label (11) has a display hole (11*a*) formed in compliance with said display window (4*h*), and a display hole (11*a*) is arranged in compliance with the circumference of said transparent member (24).

21. A rotary connector according to claim 1, wherein said floating member (6) and rotor (5) have a first mark (6*a*) and a second mark (5*b*) oppositely faced to each other when the rotary connector (1) is in a neural position, and said case (4) includes a transparent member where said first mark (6*a*) of said floating member (6) arranged below said case (4) can be visually acknowledged.

\* \* \* \* \*

UNITED STATES PATENT AND TRADEMARK OFFICE
CERTIFICATE OF CORRECTION

PATENT NO.      : 6,471,529 B2
DATED           : October 29, 2002
INVENTOR(S)     : Hiroshi Oishi It is certified that error appears in the above-identified patent and that said Letters Patent is hereby corrected as shown below:

Column 17,
Line 65, replace "(1 6a)," with -- (16a), --.

Column 18,
Line 2, replace "installed the" with -- installed at the --.

Column 20,
Line 15, replace "adheres a" with -- adheres to a --.

Signed and Sealed this

Twenty-second Day of April, 2003

JAMES E. ROGAN
*Director of the United States Patent and Trademark Office*